Patented Mar. 7, 1950

2,500,082

UNITED STATES PATENT OFFICE 2,500,082

ACYLATED DERIVATIVES OF HIGH MOLECULAR WEIGHT COPOLYMERS

Eugene Lieber, New York, N. Y., and William H. Smyers, Westfield, N. J., assignors to Standard Oil Development Company, a corporation of Delaware No Drawing. Application April 4, 1945, Serial No. 586,626

11 Claims. (Cl. 260—23)

This invention relates to novel chemical products and to methods of preparing and using same. More particularly it relates to making and using acylated derivatives of high molecular weight copolymers, particularly hydrocarbon copolymers such as the styrene-isobutylene copolymers, styrene-diolefin copolymers, styrene-acrylonitrile copolymers.

Copolymers of styrene-isobutylene, and more generally copolymers of aliphatic olefins with polymerizable cyclic compounds, are disclosed in U. S. Patent 2,274,749. The general method of preparing such copolymers is also disclosed therein and consists essentially in carrying out the copolymerization of the mixed reactants at a temperature below 0° C. such as —10° C., —50° C., —80° C., —100° C., or even lower, in the presence of an active halide polymerization catalyst, and preferably in the presence of an inert, volatile organic liquid serving as solvent and refrigerant.

Instead of styrene, other polymerizable cyclic material may be used such as alphamethyl styrene, paramethyl styrene, alphamethyl paramethyl styrene, indene, terpene, coumarone, etc., as well as copolymers of indene and coumarone.

Instead of isobutylene, other isolefins may be used such as isoamylene, particularly methyl-2 butene-1, iso-octylene etc., as well as other aliphatic olefins such as propylene and normal butylenes, and other olefinic material such as unsaturated nitriles for example, acrylonitrile etc, Diolefins may be used such as butadiene, isoprene, dimethyl-butadiene, cyclopentadiene, hexadiene, etc. Halogenated diolefins may be used such as chlorobutadiene.

The proportions in which the styrene or other polymerizable cyclic material and the isobutylene or other aliphatic olefin or diolefinic material may be copolymerized may vary over a wide range from 1% to 50% or 90% or even 99%, preferably about 1% to 60%, of the polymerizable cyclic constituent. In fact, an even smaller amount of such cyclic material may be used such as even 0.1% or less, it being sufficient to merely have 1 or 2 molecules of the styrene or other polymerizable cyclic material combined into a relatively long chain of isobutylene or other aliphatic olefin, the aromatic nucleus of the styrene serving as a chemical handle by which the high molecular weight resultant copolymer may be subjected to the subsequent acylation reaction according to the present invention.

For convenience and brevity, the above described copolymer of a cyclic polymerizable material and an olefin will be referred to as a cycalkene copolymer. The specific type of copolymer made from styrene and isobutylene will similarly be referred to for brevity as stybutene. The invention will be illustrated as applied particularly to stybutene, although it is not to be limited thereto.

The copolymer to be used may also be a tripolymer of a polymerizable cyclic compound, an olefinic compound and a small amount, e. g. 0.1% to 30%, preferably 0.5% to 10% of a diolefin, e. g., isoprene, butadiene, etc. One example of such a tripolymer is one comprising 50% isobutylene, 47% styrene and 3% isoprene in the combined state.

The acylating agent to be used according to this invention may be selected from a wide variety of materials having the general formula $R(COX)n$ where R is a hydrocarbon group, X is halogen and $n$ is an integer of 1 to 3, preferably 1 to 3, including acylating agents which are commercially available as well as others which may be made for the present purposes. These acylating agents may be either in the form of the acyl halide, preferably acyl chloride, or others such as acyl bromide. They are preferably derived from fatty acids in which the hydrocarbon radical comprises five or more carbon atoms and preferably at least five aliphatic carbon atoms, as for instance in palmitic acid, stearic acid, phenyl stearic acid, linoleic acid and dilinoleic acid. They may also be derived from such acids as maleic acid, succinic acid, adipic acid, sebacic acid, cyclohexane carboxylic acid and phthalic acid as well as acyl halides derived from other fatty acids or mixed fatty acids as derived from fatty oils such as soybean oil, corn oil, etc. Naphthenyl halides, derived from petroleum naphthenic acids may also be used. Unsaturated acylating agents may also be used, such as; oleyl chloride, linoleyl chloride, di-linoleyl chloride, etc., so the resulting product can be vulcanized if so desired.

Besides the acylating agents of the type $R(COX)n$ we can also use agents of the type $$R(SO_mX)n$$

where R, X and $n$ have the same significance as before and $m$ is an integer whose value is 1 or 2, preferably 2. These materials are commonly known as sulfonyl halides and of these the sulfonyl chlorides are preferred. Particularly valuable are the sulfonyl chlorides derived from paraffin wax, which may be designated by the formula $$wax - SO_2 - Cl$$

These materials are readily prepared by reacting paraffin wax with a mixture of gaseous sulfur dioxide and chlorine. Other sulfonyl chlorides which can be used may be mentioned: cyclohexyl sufonyl chloride, octadecyl-disulfonyl chloride, phenyl-stearyl sulfonyl chloride:

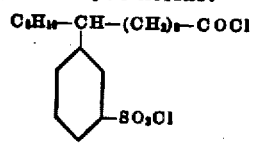

i. e., a combined sulfonyl and acyl chloride.

If the stybutene or other copolymer is made with a relatively high content of combined cyclic constitutent such as 20% or 30% or more of combined styrene, it is preferable to use an acylating agent having at least 5 aliphatic carbon atoms and preferably at least 10, stearyl chloride being a very suitable acylating agent for use in acylating such copolymers. On the other hand, when the copoylmer contains a substantially lower proportion of combined cyclic constitutent such as 15%, 10%, 5% or even 1% or lower, then any desired acylating agent may be used of either high or low molecular weight e. g., 1 to 30 or more carbon atoms.

The proportion of acylating agent to be used in relation to the copolymer, may vary over a fairly wide range, depending partly on the proportion of combined cyclic, especially aromatic, constituent in the copolymer, and upon the molecular weight of the acylating agent, but normally about 50 to 200 parts by weight and preferably 50 to 100 parts by weight of acylating agent should be used per 100 parts of copolymer. Although the proportions by weight will of course depend upon the molecular weight of the acylating agent as well as that of the copolymer, generally about 50 to 150 parts by weight of acylating agent will be satisfactory for 100 parts by weight of the copolymer.

The acylation is preferably carried out in the presence of a Friedel-Crafts catalyst such as aluminum chloride, boron fluoride, $ZnCl_2$, etc. The amount of this catalyst required is generally about 0.5 to 2.0 mol per mol of acylating agent. The acylation is also preferably carried out in the presence of a solvent such as tetrachlorethane, a refined petroleum naphtha, o-dichlorobenzene, ethylene dichloride, nitropropane, etc.

The amount of such solvent to be used, is preferably about ½ to 10 volumes, preferably about 1 to 5 volumes of solvent per volume of mixed reactants, i. e., copolymer and acylating agent. The temperature required for the acylating reaction depends partly upon the reactivity of the particular acylating agent used and upon the amount of solvent and the proportion of combined cyclic constituent in the copolymer, but normally will range from room temperature to about 300° F., and generally from about 150° F. to 250° F.

After the acylation reaction has been completed, as evidenced by the substantial cessation of hydrogen chloride evolution even with further heating, the reaction mixture may be cooled e. g., to room temperature or so, and is then preferably diluted with additional solvent and then residual aluminum chloride or other catalyst is destroyed by adding water, alcohol, aqueous hydrochloric acid or aqueous caustic soda, etc. Resulting catalyst sludge is then withdrawn and the solvent extract containing the desired acylated copolymer may be washed repeatedly until final wash water shows no test for acid with litmus paper. The acylated copolymer may, if desired, be used in solution in the solvent if thus recovered, or the solvent may be removed by distillation or other suitable means so as to recover the acylated copolymer per se. If it is desired to use the acylated copolymer eventually in solution in a mineral lubricating oil, a small amount of such oil may be added to the volatile solvent solution before evaporation of the volatile solvent, so that after such evaporation, the residue will consist of a mineral lubricating oil concentrate of the acylated copolymer, containing for instance, about 15% to 50% of such acylated copolymer.

The product of this invention, namely the acylated cycalkene copolymer is thus a high molecular weight polymeric linear type copolymer chain and having a molecular weight of at least 2,000 having attached thereto one or more acyl or sulfonyl groups, free from any interlinking in case the acylating agent used is a monobasic acylating agent, e. g., stearyl chloride, or having two or more copolymer molecules interlinked by means of the acylating agent in case a dibasic acylating agent is used such as phthalyl chloride, sebacyl chloride and the like. The molecular weight of the final product will accordingly be only slightly more than that of the original copolymer if no interlinking has taken place, but may be 2, 3 or more times as great if interlinking has been effected. This product, which generally ranges from a soft plastic to a hard waxy or resinous solid has both viscosity index improving and pour depressing characteristics, which make the product a valuable additive for mineral oils such as lubricating oils or even the more fluid oils such as a gas oil, kerosene, or even naphtha which may be useful for low temperature hydraulic oil purposes.

The product may also be sheeted into self-sustaining films or moulded, or may be compounded with paraffin wax, asphalt, various natural and synthetic resins, e. g., shellac, coumarone-indene resins, phenol-formaldehyde resins, etc. and plastics such as cellulose acetate, benzyl cellulose, polystyrene, etc., natural rubbers, synthetic rubbers such as butadiene-styrene emulsion copolymer, e. g., the one marketed commercially as Buna S butadiene-acrylonitrile copolymer, low-temperature isobutylene - isoprene copolymer, polyisobutylene, etc.

This new product may also be chlorinated, oxidized, hydrogenated, reacted with chlorinated paraffin wax, sulfurized with sulfur chloride or sulfur, or reacted with $P_2S_5$, etc.

The objects, advantages, and details of the invention will be better understood from a consideration of the following experimental data.

*Example 1*

25 gms. of a stybutene having a combined styrene content of about 50% and made at a temperature of about −103° C., in three volumes of methyl chloride per volume of mixed reactants, and having an average molecular weight of about 30,000 and an intrinsic viscosity of about 1.0, was dissolved in 150 cc. of tetrachlorethane as solvent, 6 grams of anhydrous $AlCl_3$ was added and the temperature adjusted to 110° F. While stirring, 15 grams of stearyl chloride was added to the reaction mixture over a period of 10 minutes. After the addition of the stearyl chloride the reaction temperature was increased to 125° F. and maintained thereat for 5 hours. At the end of this time, the reaction mixture was cooled and diluted with 500 cc. additional solvent and the AlCl₃ destroyed by addition of an alcohol-water mixture. The residue which amounted to 35 grams was a viscous, waxy-like, resinous material.

The pour depressing potency of this stearylated stybutene was tested by blending it in an oil comprising 90% by volume of a Pa. neutral lubricating oil base stock and 10% by volume of a Pa. bright stock, which mixed base stock had a pour point of +30° F. When the acylated copolymer was added in various concentrations, the following pour points were obtained:

|  | Pour °F. |
|---|---|
| Original oil | +30 |
| Original oil +1% product | +20 |
| Original oil +2.5% product | +10 |
| Original oil +5.0% product | + 5 |

These data show that this acylated copolymer had quite substantial pour depressing properties which is very surprising and unexpected because heretofore no high molecular weight linear type synthetic hydrocarbon polymeric materials having molecular weights above 5,000, e. g., 10,000, 20,000 etc., have ever been known to have any pour depressing properties.

This acylated copolymer was also studied for viscosity characteristics in lubricating oil solution, by dissolving it in a Pa. neutral lubricating oil base stock in several concentrations with the following results, the pour point of each blend being also shown:

|  | Viscosity (sec. Saybolt) at— | | V. I.¹ | Pour, °F. |
|---|---|---|---|---|
|  | 100° F. | 210° F. |  |  |
| Original Oil | 141 | 42.7 | 101 | +30 |
| Original Oil +2.5% Product | 160.4 | 44.7 | 112 | +20 |
| Original Oil +5.0% Product | 185.7 | 47.0 | 117 | +10 |

¹ Viscosity Index.

These data indicate that the stearylated stybutene has both viscosity index improving and pour depressing properties; in other words, pour depressing properties have for the first time been imparted to the long copolymer molecules, and this, surprisingly, without destroying the viscosity index improving characteristics of the latter.

*Example 2*

25 grams of a stybutene having a combined styrene content of about 60%, made at a temperature of —23° C., and having an average molecular weight of about 3,000, was dissolved in 125 cc. carbon tetrachloride. 66 grams of anhydrous AlCl₃ was added and the temperature adjusted to 110° F. While stirring 150 grams of stearyl chloride was added to the reaction mixture over a period of 10 minutes. After the addition of the stearyl chloride the reaction temperature was increased to 125° F. and maintained thereat for 5 hours. At the end of this time, the reaction mixture was cooled and diluted with 500 cc. additional solvent and the AlCl₃ destroyed by addition of an alcohol-water mixture. After settling and removal of the aqueous sludge layer, 100 grams of a mineral oil (43.4 SSU vis./100° F.) was added, in order to facilitate recovery of the polymer, and the solvent removed by a vacuum distillation at 60 mm. Hg pressure and 220° F. A yield of 215 grams, comprising an oil solution of the "stearylated-stybutene" was obtained. The pour depressant potency was tested by blending the product, obtained as described above, in a wax-containing lubricating oil and determining the pour point of the resulting blends by the standard A. S. T. M. procedure. The following results were obtained, the concentrations being expressed in terms of actual stearylated-stybutene:

| Per cent Additive | A. S. T. M. Pour Point, °F. |
|---|---|
| 0 | +30 |
| .25 | +5 |
| .5 | 0 |
| 1.0 | 0 |
| 2.5 | —5 |
| 5.0 | +10 |
|  | +30 |

The viscosity index was determined, the results being as follows:

|  | Sec. Saybolt Univ. Viscosity at 100° F. | Viscosity Index |
|---|---|---|
| Original Oil | 43.4 | 107 |
| Original Oil+5% product | 47.6 | 118 |

These data show that the stearylated stybutene made by Example 2 had even better pour depressing characteristics than that in Example 1, and also had substantial viscosity index improving characteristics, although the particular stybutene copolymer used as starting material did not have as good viscosity index improving characteristics as might be obtained with higher molecular weight stybutene made at lower temperature and with a lower combined styrene content.

*Example 3*

An illustration of the application of the invention to such higher molecular weight copolymers is to react a stybutene having a combined styrene content of about 5%, made at a temperature of —103° C., and having a molecular weight of about 80,000, with an acylating agent such as the stearyl chloride used in Examples 1 and 2 or with a dibasic stearylating agent such as phthalyl chloride, sebacyl chloride, dilinoleyl chloride, etc.

The invention may also be carried out by reacting the copolymer with other treating agents having the general formula R(YOX)ₙ where X is halogen, Y is C, S, or SO, and n is 1 to 3; for instance wax sulfonyl chloride may be used, having the formula R(SO₂Cl)ₙ, where R is a paraffin wax molecule and n has an average value of from 1 to 2.

It is not intended that this invention be limited to the specific materials which have been given merely for the sake of illustration, but only by the appended claims in which it is intended to claim all novelty inherent in the invention, as well as all modifications coming within the scope and spirit of the invention.

We claim:

1. Process according to claim 7 using a monobasic acylating agent.

2. Process according to claim 7 using stearyl chloride as acylating agent.

3. Process according to claim 7 using a dibasic acylating agent.

4. Process according to claim 7 using sebacyl chloride as acylating agent.

5. Process according to claim 7 using a copolymer having a combined styrene content of 20% to 40%.

6. The process which comprises reacting a substantially linear styrene-isobutylene copolymer having an average molecular weight of 3,000 to 30,000 and a styrene content of 20–60% by weight with stearyl chloride in the presence of aluminum chloride as catalyst and in the presence of an inert non-aqueous solvent, hydrolyzing and removing residual catalyst and subjecting the reaction products to distillation under reduced pressure to obtain the desired stearyl styrene-isobutylene copolymer as distillation residue.

7. The process which comprises acylating a substantially linear styrene-isobutylene copolymer having a molecular weight of from 3,000 to 30,000 and having a styrene content of from 1–60% by weight, with an aliphatic acylating agent having the general formula $R(COX)_n$, X being a halogen, $n$ being a number from 1 to 2 and and R being an aliphatic hydrocarbon group of at least 5 and not more than 30 carbon atoms, said acylation being carried out by combining 50 to 150 parts by weight of acylating agent with 100 parts by weight of the copolymer in the presence of a Friedel-Crafts catalyst.

8. A process according to claim 6 wherein the styrene content of the copolymer is from 40% to 60% by weight.

9. A product according to claim 10 wherein the styrene content of the copolymer is from 40% to 60% by weight.

10. An acylated substantially linear copolymer of styrene and isobutylene, said copolymer having a styrene content of from 1 to 60% by weight and a molecular weight, before acylation, of from 3,000 to 30,000, said acylating radical having the general formula $R(CO)_n$—, $n$ being a number from 1 to 2 and R being an aliphatic hydrocarbon group of from 5 to 30 carbon atoms.

11. A stearylated substantially linear styrene-isobutylene copolymer, said copolymer having a styrene content of from 1 to 60% by weight and a molecular weight, before stearylation, of from 3,000 to 30,000.

EUGENE LIEBER.
WILLIAM H. SMYERS.

REFERENCES CITED

The following references are of record in the file of this patent:

UNITED STATES PATENTS

| Number | Name | Date |
| --- | --- | --- |
| 2,150,156 | Dietrich | Mar. 14, 1939 |
| 2,186,359 | Britton et al. | Jan. 9, 1940 |
| 2,197,709 | Ralston et al. | Apr. 16, 1940 |
| 2,213,423 | Wiezevich | Sept. 2, 1940 |
| 2,274,749 | Smyers | Mar. 2, 1942 |
| 2,288,319 | Mikeska et al. | June 30, 1942 |
| 2,352,280 | Mikeska | June 27, 1944 |